United States Patent
McGowan et al.

(10) Patent No.: US 6,983,985 B2
(45) Date of Patent: Jan. 10, 2006

(54) SEAT AND STORAGE BIN COVER ASSEMBLY

(75) Inventors: Robert McGowan, Waterford, MI (US); Glenn F. Syrowik, Ortonville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/862,654

(22) Filed: Jun. 7, 2004

(65) Prior Publication Data

US 2005/0269843 A1 Dec. 8, 2005

(51) Int. Cl.
*B60N 2/30* (2006.01)
(52) U.S. Cl. .............................. 297/15; 296/66; 296/69
(58) Field of Classification Search .................. 297/15; 296/66, 69
See application file for complete search history.

(56) References Cited

U.S. PATENT DOCUMENTS

| | | | | |
|---|---|---|---|---|
| 3,097,881 A | * | 7/1963 | Aguilar | 296/66 |
| 3,151,906 A | * | 10/1964 | Roberts | 296/66 |
| 4,443,034 A | * | 4/1984 | Beggs | 296/69 |
| 4,519,646 A | * | 5/1985 | Leitermann et al. | 297/15 |
| 4,652,046 A | * | 3/1987 | Compagnone nee Chatenay | 297/15 |
| 5,195,795 A | | 3/1993 | Cannera et al. | |

FOREIGN PATENT DOCUMENTS

JP 56146433 A * 11/1981

* cited by examiner

*Primary Examiner*—Anthony D. Barfield
(74) *Attorney, Agent, or Firm*—Ralph E. Smith

(57) ABSTRACT

A cover assembly covers a recess in the floor of a motor vehicle. With a stowed vehicle seat in the recess, the cover assembly serves to completely cover the recess to form a continuous load floor in the vehicle. With the seat in a use position outside of the recess, the cover assembly includes a portion that is folded within the bin so that the support legs of the seat can extend from the recess to support the seat. The cover assembly includes multiple panels for folding the cover to provide clearance by the seat for opening the cover.

12 Claims, 4 Drawing Sheets

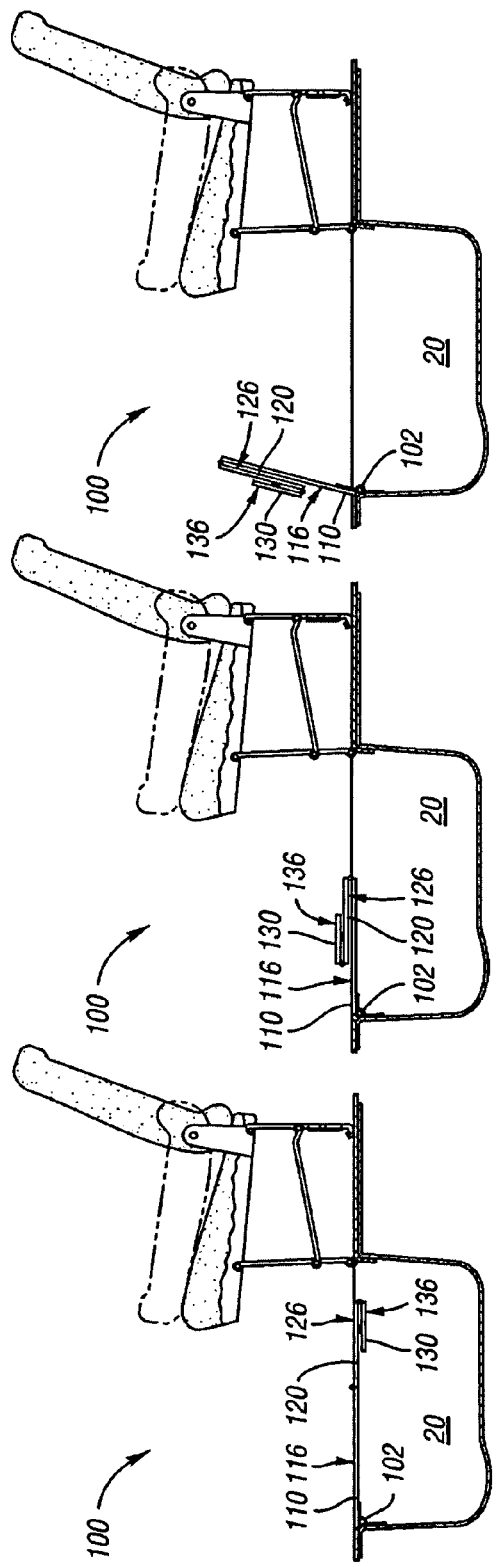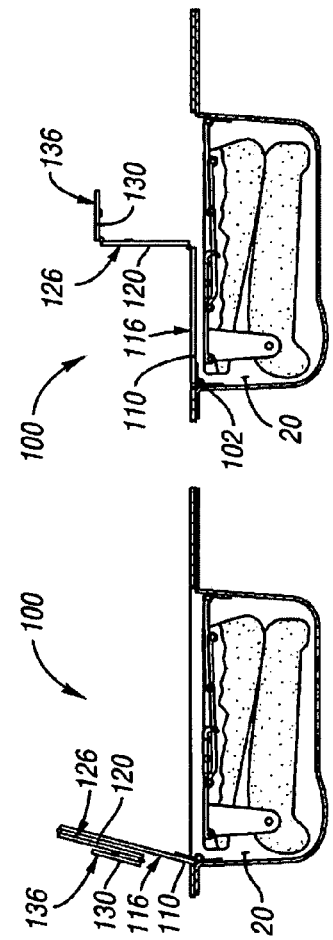

SEAT AND STORAGE BIN COVER ASSEMBLY

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to automobile seating and storage components, and more specifically to multiple-use in-floor storage receptacles for receiving seating components adapted to fold and store in the receptacle, and a cover assembly for the in-floor receptacle.

2. Description of Related Art

Automobiles with folding or removable seats are well known in the art. The purpose of such seats is to adapt the automobile to multiple functions, such as carrying passengers or carrying cargo. Each of these methods of adapting the automobile has had its respective advantages and disadvantages. The removable seat maximizes the availability of cargo volume, but requires much greater effort on the part of the user to physically remove the seat, and requires that the removed seat be stored outside the vehicle. The vehicle may thus not be available for conversion back to passenger-carrying away from the seat storage location. A folding seat can require minimal actions on the part of the user, but afford only a partial use of available vehicle volume for cargo. The cargo volume may also be uneven, providing an irregular load floor. A further configuration involves folding a seat into a recess for storage to maximize available cargo room, while keeping the seat with the vehicle for later use. This configuration must still deal with the issue of an uneven load floor and the existence of the recess when the seat is in the deployed position.

It would be advantageous to provide an in-floor recess for storage of a folding seat, with a means of covering the recess during seat use, and providing a flat load floor during seat storage.

BRIEF SUMMARY OF THE INVENTION

A seat and storage bin cover assembly comprises a first leaf hinged to the floor, a second leaf hinged to the first leaf, and a third leaf hinged to the second leaf. The first, second and third leaves are deployed when a seat is stored in the bin, to cover the bin, and the first and second leaves are deployed when the seat is in an upright use position, with the third leaf being contained within the bin.

In the combination of a folding seat and storage bin having a cover assembly, with the folding seat including seat pivot structure and being pivotally connected adjacent the storage bin for rotation from an upright use position to a storage position fully contained within the storage bin, and the storage bin including a cover assembly, the cover assembly comprises a first leaf hinged to the floor, a second leaf hinged to the first leaf, and a third leaf hinged to the second leaf. The first, second and third leaves are deployed to cover the bin when the seat is in the storage position within the bin, and the first and second leaves are deployed to cover the bin when the seat is in the upright use position, with the third leaf being contained within the bin.

BRIEF DESCRIPTION OF THE SEVERAL VIEWS OF THE DRAWINGS

The present invention will become more fully understood from the detailed description and the accompanying drawings, wherein:

FIGS. 5a–5f are sequential side views of the seat and storage bin of FIGS. 1–4 moving from a deployed use position to a stored position.

DETAILED DESCRIPTION OF THE INVENTION

Figure 1:
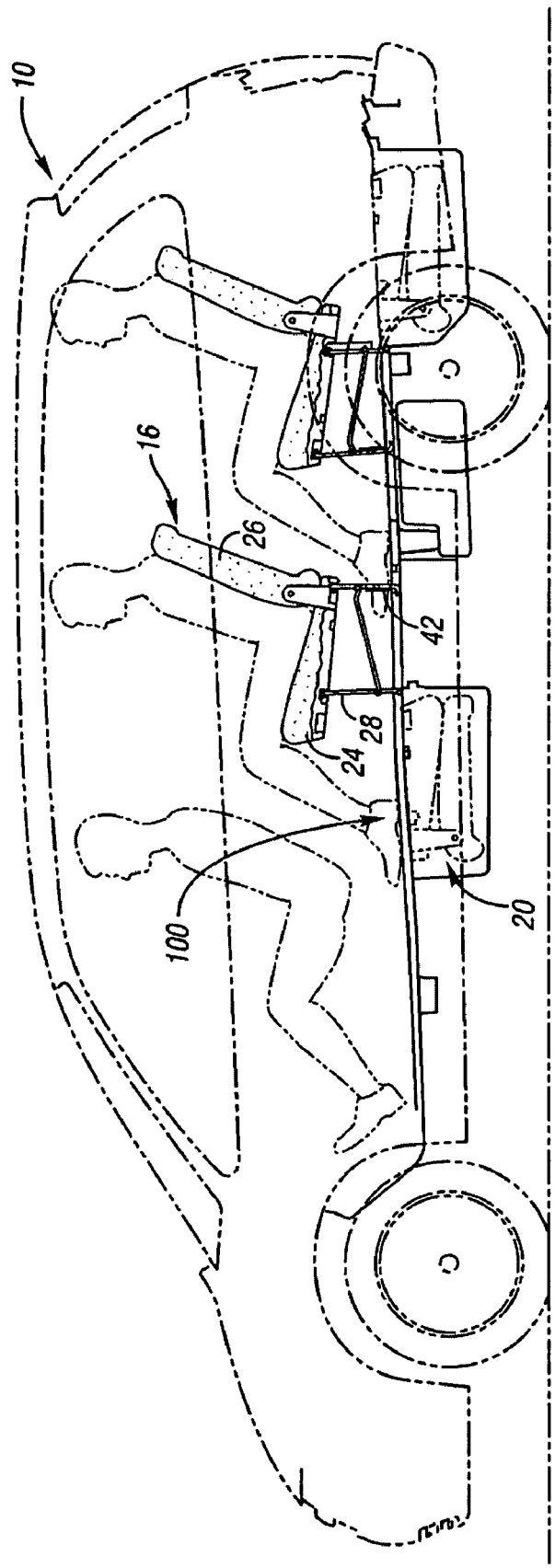
FIG. 1 is a side view of a vehicle including an in-floor folding seat storage system, with a seat and storage bin cover assembly according to the invention.

Referring to FIG. 1, a vehicle 10 includes a folding seat assembly 16 adapted to fold into a recess in the vehicle load floor. In the present example, the vehicle includes three rows of seats, the second and third row seats being shown occupied in a deployed use position, and also being shown in phantom in a folded, storage position. The second row seat is shown in phantom folded forward into an in-floor storage bin 20 with a cover assembly 100.

Figure 2:
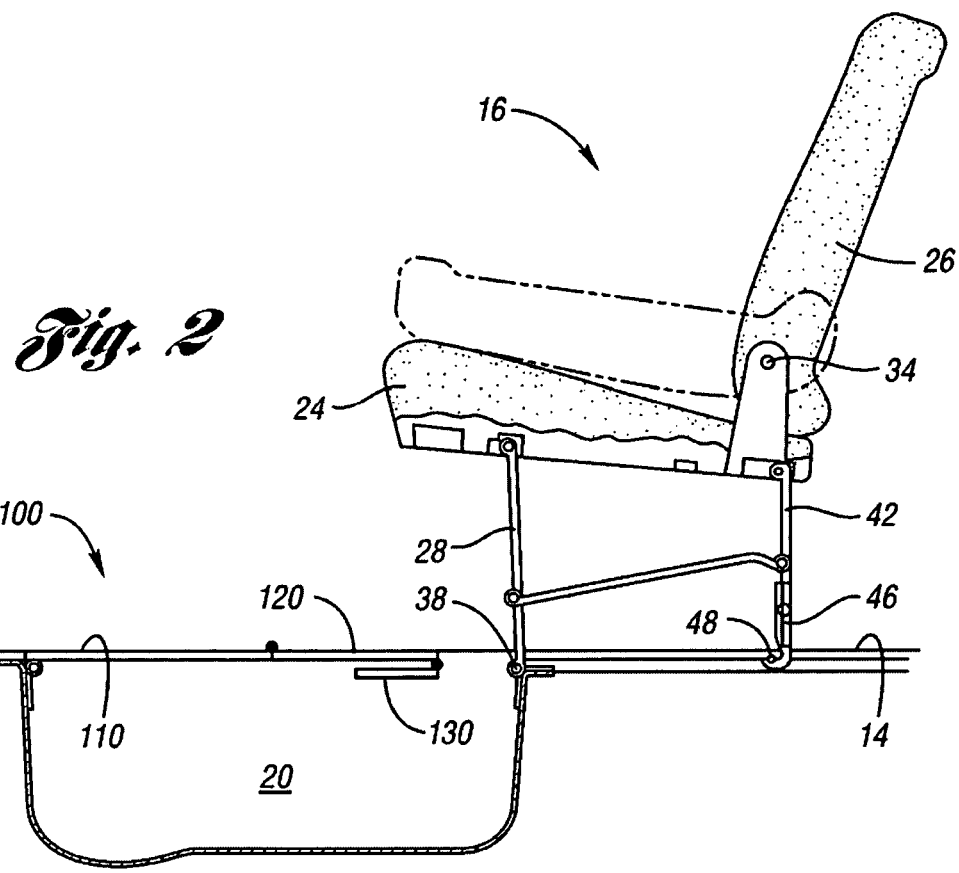
FIG. 2 is a side view of the seat and storage bin cover assembly of FIG. 1, with the seat in a deployed use position.

FIG. 2 shows an enlarged side view of the seat and storage bin cover assembly. The seat 16 comprises a seat base 24 and a seat back 26 and is in the upright, deployed use position. The seat is supported by front and back legs 28, 42. The back legs 42 include a hook mechanism 46 engaged with a pin 48 in the load floor 14 of the vehicle. The front legs 28 are mounted to a pivot 38, proximate the juncture of the load floor 14 and the rear edge of the storage bin 20. The actual mounting point of the pivot 38 can be within the storage bin 20 or proximate the storage bin 20 within a recess of the load floor 14. This mounting position enables the seat 16 to be pivotally mounted to a fixed point within the vehicle, and completely stowable within the storage bin 20, as shown in FIG. 4.

The storage bin 20 is covered by a cover assembly 100, as shown in FIG. 2, which provides a place for a seat occupant to place their feet. The storage bin 20, enclosed by cover assembly 100, provides additional, concealed, cargo capacity within the vehicle when the seat is in the deployed position. The cover assembly protects and conceals the stored cargo.

Figure 3:
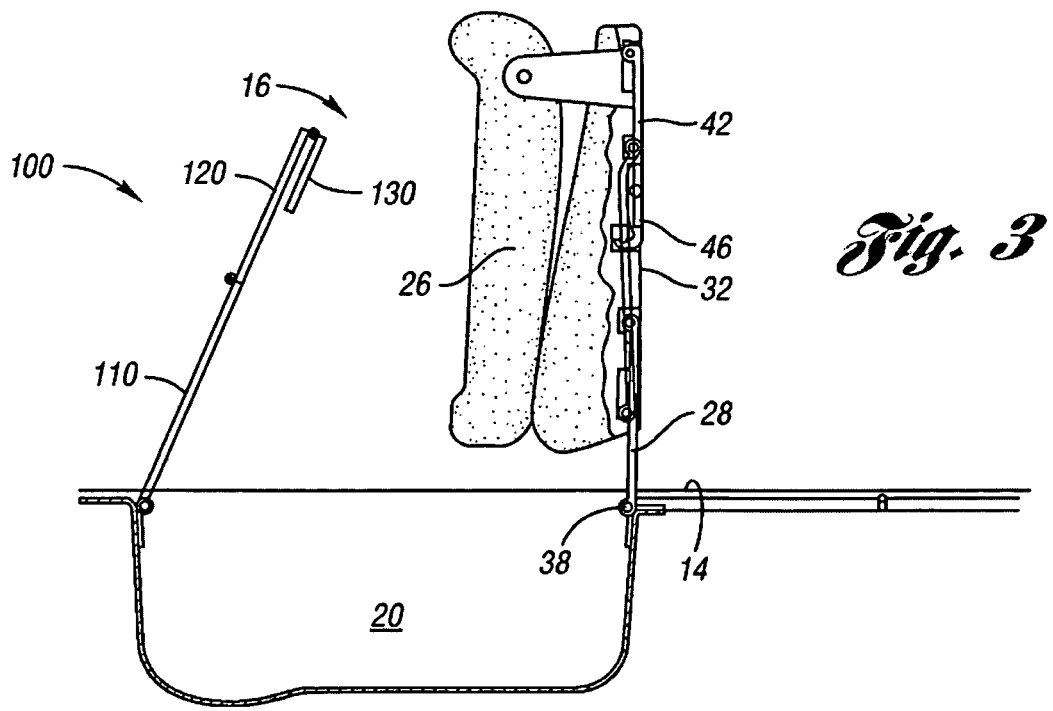
FIG. 3 is a side view of the seat and storage bin cover assembly of FIGS. 1–2, with the seat partially folded toward a storage position.
Figure 4:
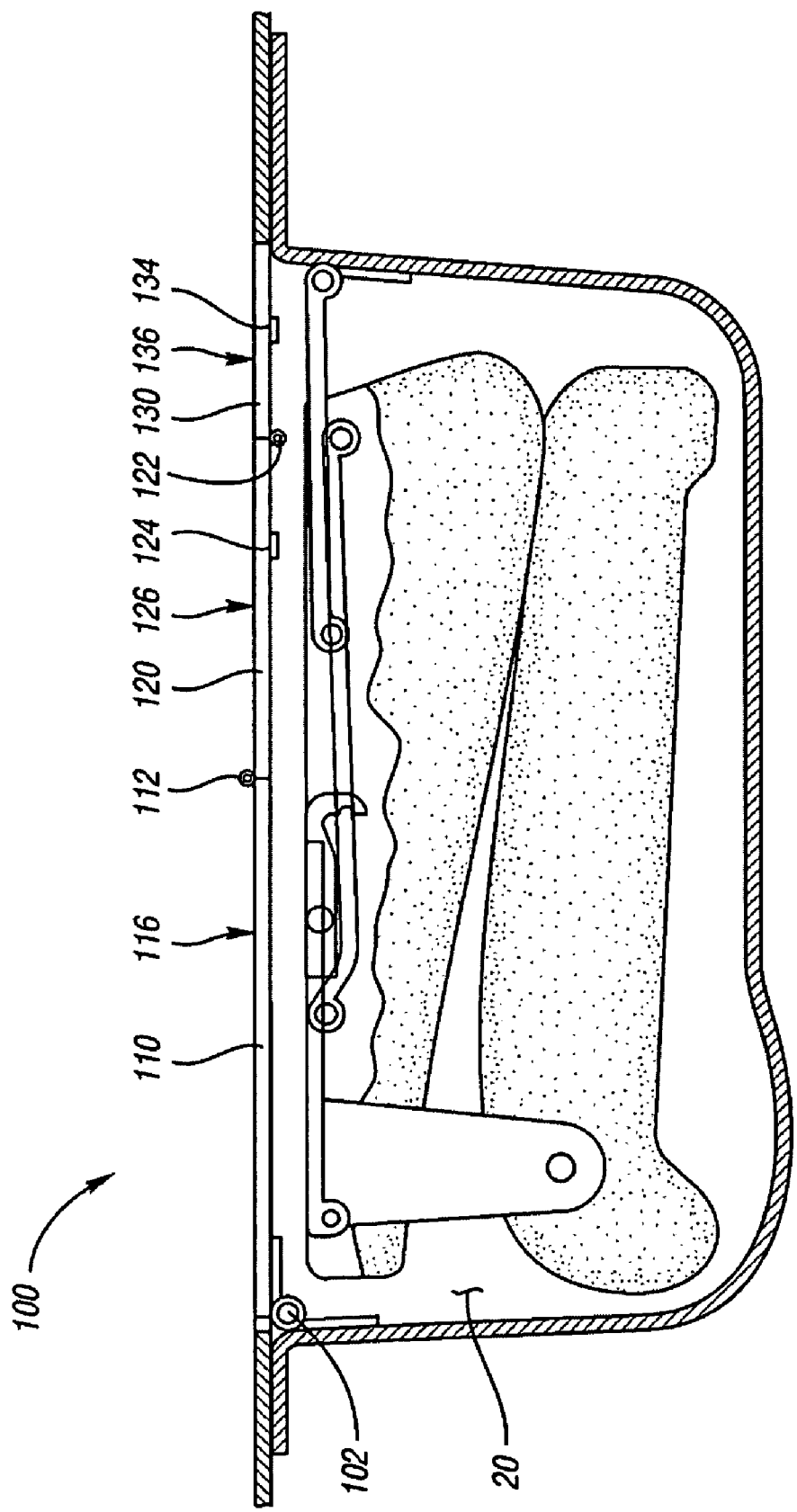
FIG. 4 is a side view of the seat and storage bin cover assembly of FIGS. 1–3, with the seat in a folded and stored position within the storage bin.

Referring to FIGS. 2–4, the cover assembly 100 is formed of multiple hinged leaves 110, 120, 130. Hinged leaf 110 is mounted to the forward edge of storage bin 20 by a step-function spring-biased first hinge 102, so that as the cover assembly is raised toward the position shown in FIG. 3, the spring bias of first hinge 102 takes over and holds the cover assembly 100 in the raised position.

Second leaf 120 is connected to first leaf 110 by a piano-style second hinge 112, permitting second leaf 120 to fold over first leaf 110, but not to collapse into storage bin 20 as cover assembly 100 is raised about first hinge 102.

Third leaf 130 is connected to second leaf 120 by a piano-style third hinge 122. Third hinge 122 permits third leaf 130 to rotate opposite the direction of rotation of second leaf 120, so that third leaf 130 can rotate to the retracted position as shown in FIG. 2.

In the retracted position of FIG. 2, third leaf 130 is rotated about third hinge 122 and hangs downward into storage bin 20. In a further embodiment shown in FIG. 5a, the third leaf can be folded flat against the underside of second leaf 120. In either position, the rear upper edge of storage bin 20 is unobstructed. In this manner, the front legs 28 of the seat 16 can extend upwardly unobstructed to support the seat 16 in its upright deployed position.

As shown in FIG. 4, each of the second leaf 120 and the third leaf 130 are provided with a latching mechanism 124, 134. This latching mechanism can be in the form of a hook and loop fastener, such as Velcro®, a snap, button, hook, magnet, or any other well known readily detachable means of holding the third leaf 130 up out of the storage bin as the cover assembly 100 is lowered to the closed position, according to the embodiment of FIG. 5a.

Referring now to FIGS. 5a–5f, moving the seat assembly 16 from the deployed position to the stored position requires that the cover assembly 100 be opened to uncover the storage bin 20. In FIG. 5a, third leaf 130 is already folded against the underside of second leaf 120; the embodiment of FIG. 2 would first require folding third leaf 130 against second leaf 120.

Second leaf 120 may include a secondary latch mechanism keeping it in a closed position over storage bin 20. Second leaf 120, with third leaf 130 folded against it or hanging freely, is configured so that it can rotate about second hinge 112 and clear the front edge of the seat assembly 16. After releasing the latch mechanism of second leaf 120, second leaf 120 is rotated about second hinge 112 until it lies over first leaf 110. First leaf 110 can then be rotated about first hinge 102 to a generally upright position, clearing the opening of storage bin 20. Seat assembly 16 is then released from its deployed position, and sequentially folded into the storage bin 20 as shown in FIGS. 2, 3 and 5d–5e.

After seat assembly is folded in storage bin 20, cover assembly 100 is then rotated back down over the opening of storage bin 20. Third leaf 130 is detached from the underside of second leaf 120, and second and third leaves 120, 130 are unfolded and extended to cover the remainder of the opening of storage bin 20, as shown in FIGS. 4 and 5f. The seat assembly pivots about its front leg to be totally enclosed within storage bin 20, so that fully extended cover assembly 100 completely covers storage bin 20, presenting a continuous load floor within the vehicle.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A seat and storage bin and a cover assembly, comprising:
    a first leaf hinged to a floor of a motor vehicle;
    a second leaf hinged to the first leaf; and
    a third leaf hinged to the second leaf,
    whereby the first, second and third leaves are deployed when a seat is stored in a bin disposed at least partially in the floor, to cover the bin, and whereby the first and second leaves are deployed when the seat is in an upright use position, the third leaf being contained within the bin.

2. The assembly of claim 1, wherein the third leaf is adapted to fold flat against an underside of the second leaf.

3. The assembly of claim 2, further comprising a fastener to hold the third leaf flat against the underside of the second leaf.

4. The assembly of claim 1, wherein the third leaf is adapted to hang downward within the bin.

5. The assembly of claim 1, wherein the third leaf covers seat support structure when the seat in stored in the bin.

6. The assembly of claim 5, wherein the third leaf clears the seat support structure when the seat is in the upright use position.

7. In combination, a folding seat and storage bin having a cover assembly, the folding seat including seat pivot structure and being pivotally connected adjacent the storage bin for rotation from an upright use position to a storage position fully contained within the storage bin, the storage bin including a cover assembly, the cover assembly comprising:
    a first leaf hinged to the floor;
    a second leaf hinged to the first leaf; and
    a third leaf hinged to the second leaf,
    whereby the first, second and third leaves are deployed to cover the bin when the seat is in the storage position within the bin, and whereby the first and second leaves are deployed to cover the bin when the seat is in the upright use position, the third leaf being contained within the bin.

8. The combination of claim 7, wherein the third leaf is adapted to fold flat against an underside of the second leaf.

9. A motor vehicle having a folding seat and storage assembly comprising:
    a folding seat having a pivotal connection to a motor vehicle floor, the pivotal connection arranged to enable the folding seat to rotate between an upright use position and a storage position;
    a storage bin disposed at least partially within the motor vehicle floor and located to receive the folding seat when pivoted to the storage position; and
    a cover mechanism having a first leaf hinged to the floor adjacent the storage bin, a second leaf hinged to the first leaf, and a third leaf hinged to the second leaf, the first, second and third leaves being extended when the folding seat is in the storage position, and the first and second leaves being extended when the folding seat is in the upright use position, the third leaf being contained within the storage bin.

10. The motor vehicle of claim 9 wherein the first leaf is hinged adjacent the storage bin at a side opposite the pivotal connection.

11. The motor vehicle of claim 9 including;
    a forward row of seats including a driver's seat; and
    at least one additional row of seats including a plurality of passenger seats, the at least one additional row of seats further comprising the folding seat.

12. The motor vehicle of claim 9 wherein the storage bin is capable of receiving at least one item when the folding seat is in the upright use position.

* * * * *